July 30, 1935.　　　　　F. SPELL　　　　　2,009,862
AUTO LOCKING DEVICE
Filed May 3, 1934　　　　2 Sheets-Sheet 1
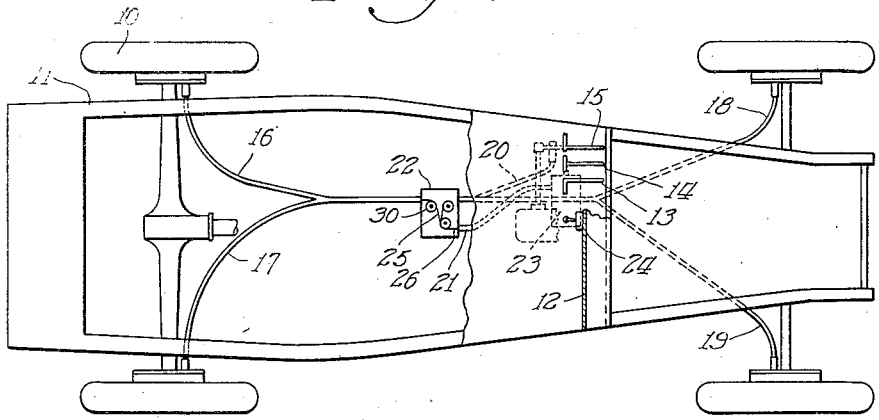
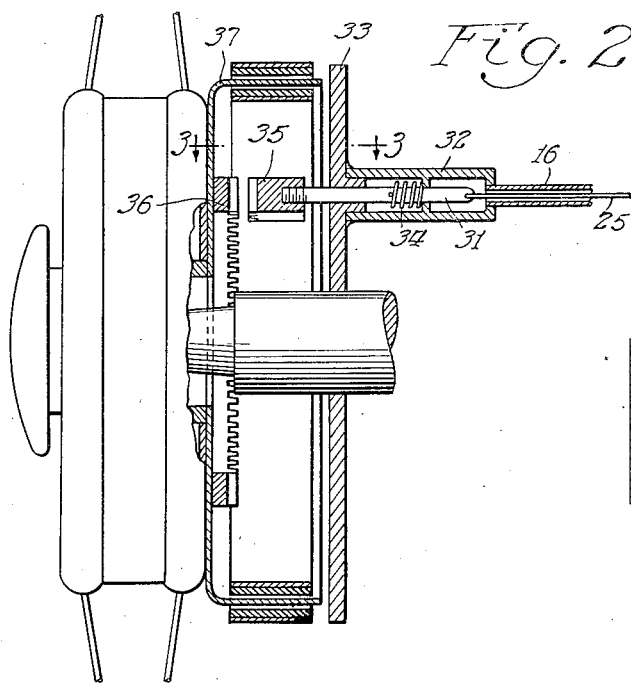
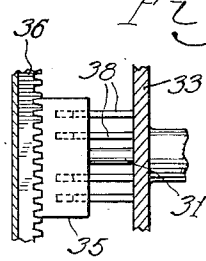
Inventor
Fred Spell
By:
Zabel Carlson & Wells
Attys

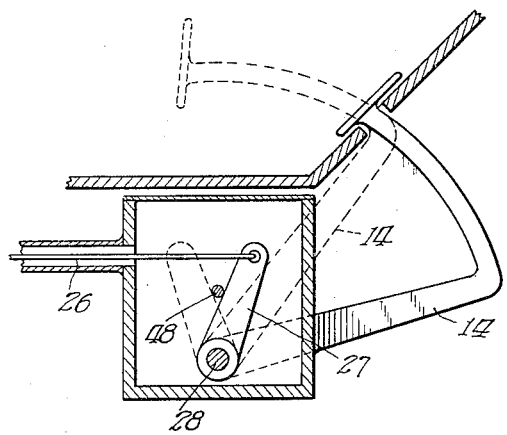
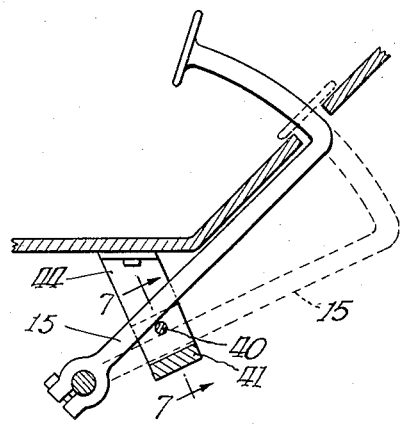
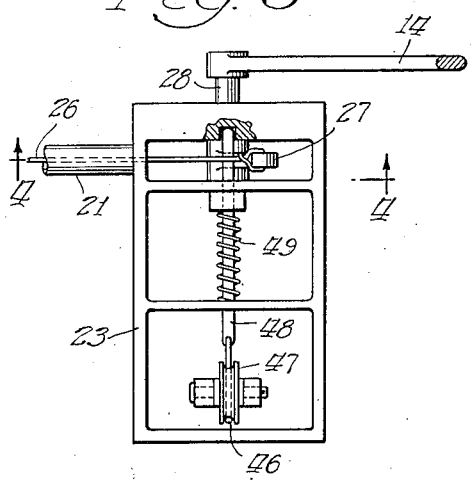
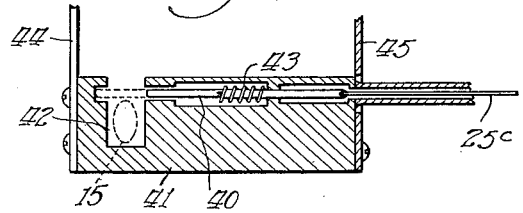

Patented July 30, 1935

2,009,862

UNITED STATES PATENT OFFICE 2,009,862

AUTO LOCKING DEVICE

Fred Spell, Chicago, Ill.

Application May 3, 1934, Serial No. 723,639

5 Claims. (Cl. 188—31)

This invention relates to locking devices particularly for locking vehicles such as automobiles to prevent theft thereof.

It is the principal purpose of this invention to provide means whereby a vehicle when locked by this means can only be moved by sliding the wheels, unlocking the lock, or bodily picking up the vehicle.

One of the important features of the locking device is that any attempt to destroy the locking device will in the main result in fixing the locking device so that it cannot be unlocked without a great deal of trouble.

It is a well-known fact that despite the many devices that have been tried for this purpose, there is still no accepted locking mechanism which protects the public against the quick theft of automobile vehicles.

My invention contemplates such a device which can be readily applied to vehicles already in operation on the streets and which may also be built in as a standard part of new vehicles.

I will describe one form which my invention may take by reference to the accompanying drawings wherein—

Fig. 1 is a plan view partly in section and more or less diagrammatic of a vehicle having my invention applied thereto;

Fig. 2 is a vertical section through the brake drum of the vehicle wheel showing the manner in which the locking mechanism operates;

Fig. 3 is a fragmentary section taken substantially on the line 3—3 of Fig. 2;

Fig. 4 is an enlarged section showing the manner in which the locking is applied;

Fig. 5 is a plan view partly in section of the structure shown in Fig. 4;

Fig. 6 is a section through the floor board of a car illustrating the clutch pedal locking device; and Fig. 7 is a section on the line 7—7 of Fig. 6.

Referring now in detail to the drawings, the vehicle wheels will be referred to by the numeral 10. The vehicle body is designated by the numeral 11. The numeral 12 indicates the dash board, while numerals 13, 14, and 15 indicate respectively the brake pedal, the locking pedal, and the clutch pedal of the vehicle.

It will be observed from Fig. 1 that suitable conduits 16 and 17 lead to the rear wheels while conduits 18 and 19 lead to the front wheels. These conduits may be, where necessary, of the semiflexible type, but they are constructed of strong metal so as to present a substantial problem to one desiring to cut them. The conduit 20 leads to a locking device for the clutch pedal, while the conduit 21 leads from the junction box 22 for the various conduits to the control or locking box 23. A suitable lock 24 mounted on the dash controls the lock box 23. Within each of the conduits mentioned, there is a flexible lead such as 25, and these leads are combined as shown in Fig. 1 in the junction box into a single lead 26 which passes through the conduits 21 into the lock box 23 where it is attached to an arm 27 on the shaft 28, shaft 28 being provided with the lock pedal 14 which pedal is preferably located directly between the clutch pedal and the brake pedal.

Now, when the pedal 14 is pushed down into the full line position as shown in Fig. 4, it pulls the arm 27 to pull the flexible lead 26 and thereby draw all of the leads in the conduits 16, 17, 18, 19, and 20 toward the junction box 22 which has suitable pulleys such as 30 as indicated in Fig. 1. The effect of this action is best explained by reference to Fig. 2 wherein the actual wheel locking device is illustrated. Here the flexible lead 25 connects to the pin 31 which is housed in the tubular member 32 fixed on the stationary frame part 33 of the vehicle by any suitable means as by welding. This pin is spring pressed by means of the spring 34 so as to tend to move to the left as shown in Fig. 2 to advance the gear segments 35 against the ring gear 36 within the brake drum 37. The pull of the lever 14 and arm 27 is transmitted through the flexible leads 26 and 25 to pull all of such pins 31 on the wheels into retracted position as shown in Fig. 2 thus leaving the wheels free to rotate. The gear segments 35 are further strengthened in their connection to the frame 33 by the several pins such as 38 on which the gear segments slide.

It is believed to be evident that, when the lock pedal 14 and arm 27 are released to move into the dotted line position shown in Fig. 4, the flexible members 25 and 26 will allow the springs such as 34 to push their respective springs 31 toward the wheels and cause engagement of the gear segments such as 35 with the gear rings 36 mounted within the brake drums of the several wheels thus rigidly locking each wheel against rotation.

In order to release the car it is necessary either to actuate the locking device or to cut the various conduits that house the flexible leads and pull these leads out so as to release the locking gear segments. An operation of this kind requires sufficient time to prevent most all vehicle thefts, especially since the conduits such as 16 to 21 may be placed in the most inaccessible positions beneath the vehicle body.

To further insure the locking of the car, and to prevent accidental damage by starting of the car when the locking devices are not released, I provide means whereby the clutch lever may be locked down or up when the locking device is operated. To this end, one of the flexible leads 25c leads to a pin 40 in the block 41 which block has a recess 42 for receiving the clutch pedal 15. It is evident that, if the clutch pedal is pushed down in the dotted line position shown in Fig. 6 and the pin 40 is then released by letting up the locking pedal 14, the spring 43 will push the pin across the recess 42 and lock the clutch pedal so that it cannot be raised until the locking device is released. This prevents the starting of the engine and the throwing of the clutch in before releasing the locking device thus avoiding the stripping of gears or damage to the driving mechanism of the car. The block 41 is secured, of course, by means of the brackets such as 44 and 45 to the floor of the car.

Referring now more particularly to Figs. 1, 4, and 5, the lock 24 is preferably a combination lock or something of that sort which must be operated from within the car to exert a pull upon the flexible lead 46 which passes down from the dash into the lock box 23 and around a pulley 47 to engage the pin 48, this pin 48 being normally spring pressed by the spring 49 to push the pin into the position shown in Fig. 5, which is locking position.

Now, by operating the lock, the flexible lead 46 may be pulled to withdraw the pin 48 and thus permit the rocking of the arm 27 between the full line position shown in Fig. 4 which is the free or unlocked position and the dotted line position shown in Fig. 4 which is the locked position. A single lock is thus provided for locking the five elements most necessary to permit the vehicle to go. Furthermore, the locking system is, by means of the pins 49 and the arm 27 locked in unlocked position the same as it is locked in locked position thus making it more fool proof and preventing accidents.

From the above description, it is believed that the construction and operation of this device will be clear to those skilled in this art and the advantages thereof readily apparent.

Having thus described one specific form of my invention, what I claim as new and desire to secure by Letters Patent is:

1. A vehicle locking device comprising cooperating pairs of members on the wheels and adjacent frame portions of the vehicle adapted to interengage to lock the wheels against rotation, means yieldingly urging said members into engagement, flexible control elements leading from said members to a centrally controlled point on the car vehicle body, means within the vehicle body for transmitting power through said flexible elements to disengage the locking members, and a control lock controlling the action of said last named means whereby to lock said members either in engaged or disengaged position, said power transmitting means comprising a control box, a shaft journalled therein, an arm on said shaft within the box, and a foot pedal projecting from the shaft for rocking it.

2. A locking system for automobiles having wheels provided with brake drums and having a clutch pedal controlling connection of the power source to the wheels, said system comprising pairs of cooperating interlocking members in the brake drums, and on the adjacent frame portions of the automobile means yieldingly urging said members together, a flexible control element for each pair of members, said elements extending to a centrally controlled point on the automobile body, a locking device for locking said clutch pedal, a flexible control element for said locking device, and means for operating all of said control elements together to release the members and locking device.

3. A vehicle locking device comprising cooperating pairs of members on the wheels and adjacent frame portions of the vehicle adapted to engage with each other to lock the wheels against rotation, flexible control elements leading from said members to a centrally controlled point on the car vehicle body, means within the vehicle body for transmitting power through said flexible elements to disengage the locking members, a control lock controlling the action of said last named means whereby to lock said members either in engaged or disengaged position, said power transmitting means comprising a control box, a shaft journalled therein, an arm on said shaft within the box, means operated from said control lock for locking said arm in either of two positions, and means projecting from the shaft for rocking it between the two positions.

4. A locking system for automobiles having wheels provided with brake drums and having a clutch pedal controlling connection of the power source to the wheels, said system comprising pairs of cooperating interlocking members, one member of a pair being mounted in the brake drum, and the other member on the adjacent frame portion of the automobile, a flexible control element for operating each pair of interlocking members, said control elements extending to a centrally controlled point on the automobile body, a locking device for locking said clutch pedal in position to disconnect the power source from the wheels, a control element for said locking device, and means for operating all of said control elements together to lock said clutch pedal in position to disconnect the power source from the wheels when said interlocking members are engaged to lock the wheels against rotation.

5. A locking device for power driven vehicles comprising cooperating pairs of members on the wheels and the adjacent frame portions of the vehicle adapted to engage each other to lock the wheels against rotation, a clutch device for connecting said wheels to a source of power carried by the vehicle, power transmission means leading from said members to a central control point on the vehicle body, means within the vehicle body for transmitting power through said means to actuate the locking members, a locking member for said clutch device adapted to lock it in position to disconnect the power from the wheels of the vehicle, a common actuating means for said power transmitting means and said last named locking member, and a control lock for positively locking said actuating means.

FRED SPELL.